Feb. 2, 1954     C. A. McNUTT     2,667,829
COMBINATION BAKING AND SERVING UTENSIL FOR PASTRIES
Filed Dec. 30, 1950
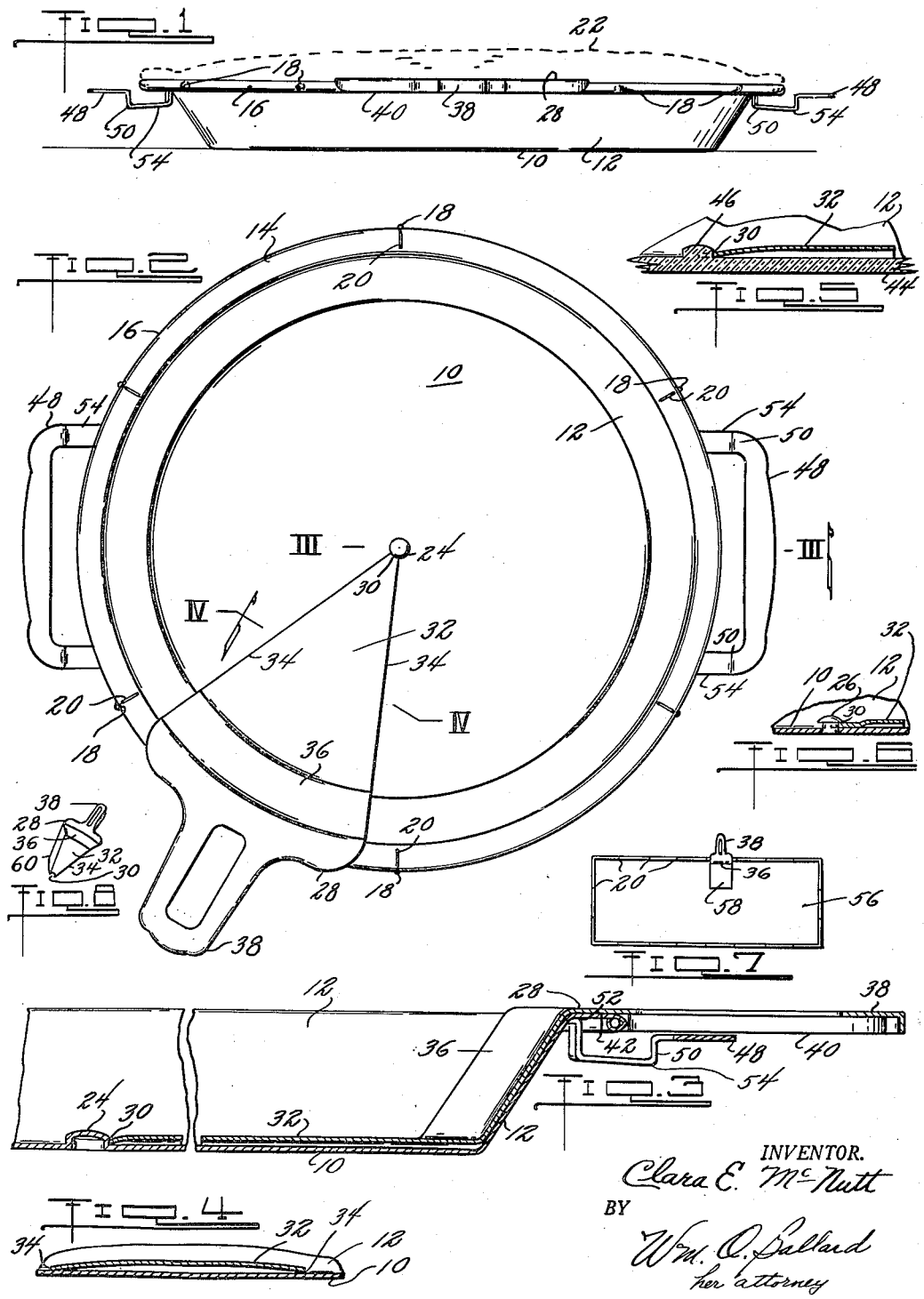
INVENTOR.
Clara E. McNutt
BY
Wm. O. Ballard
her attorney Patented Feb. 2, 1954

2,667,829

UNITED STATES PATENT OFFICE 2,667,829

COMBINATION BAKING AND SERVING UTENSIL FOR PASTRIES

Clara E. McNutt, Toledo, Ohio

Application December 30, 1950, Serial No. 203,649

1 Claim. (Cl. 99—429)

This invention relates to baking utensils.

An object of this invention is to provide a utensil particularly of the pan type, having an accessory incorporated therewith to be used as a serving device for the comestibles baked therein.

Another object of this invention is to provide a baking utensil having a device incorporated therewith, for removing and serving therefrom, predetermined portions of the contents.

Another object of this device is to provide means for interlocking a serving device within a baking utensil, which device remains therein during the baking and is thereafter used to loosen the baked products from the utensil, and to remove and serve predetermined cuts thereof.

Another object of this invention is to provide a combination within a baking utensil, of a cut-indexing system with a serving tool, whereby an effective operation of the server is visibly indicated.

Other objects and advantages of this invention relating to the arrangement, operation and function of the related elements of the structure, to various details of construction, to combinations of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings:

Fig. 1 is a side elevation of a baking utensil embodying a form of the invention disclosed herein;

Fig. 2 is a plan view of the utensil of Fig. 1;

Fig. 3 is a view on the line III—III, Fig. 2, the server being shifted to center along the view line;

Fig. 4 is a view on the line IV—IV, Fig. 2;

Fig. 5 is a fragmentary section through a modified form of a tool centering abutment, more particularly adapted to molded bake-ware such as glass and the like;

Fig. 6 is a view similar to Fig. 5, showing an abutment adaptable to stamped or spun sheet metal ware;

Fig. 7 is a plan view showing an embodiment of the invention in a rectangular form of baking utensil; and Fig. 8 is a perspective view of a modified form of lifting tool.

A preferred form of the invention is herein shown incorporated within a circular baking dish commonly referred to as a pie-pan, wherein the planar bottom 10 is surrounded by an integral upwardly and outwardly flared side wall 12 terminating in an outwardly extending peripheral rim 14. The rim 14 has a finished edge formed by a rolled bead 16. The bead 16 may have small blisters or like protuberances 18 pressed outwardly therefrom in registry with embossed indicators on the rim 14. These indicators provide an index as a guide to severing sections of the baked goods 22. Normally the lines 20 are sufficient, but when the pastry 22, such as a pie, may have its crust cover these indicators, the nibs 20 can provide the desired indication.

The number and arrangement of these markings and signals can be predetermined and for purposes of illustration herein, are shown as six in number.

The base 10 of the pan is provided with an axial abutment which may assume various forms to fit in with the overall construction. In a stamped or spun sheet metal pan, the abutment may be an integral crown or cap-shaped boss 24 or this abutment may be a rivet-like insert 26.

Nested within the pan is a trowel-shaped tool 28 having a terminal seat 30 notched to embrace the axial abutment and segmental plate portion 32 cross-sectionally arched so that the bounding edges 34 provide a knife effect when shifted along the upper face of the bottom or floor 10.

This tool has portion 36 to nest or coextensively abut a portion of the flanged side 12 and from said portion, a handle 38 extends outwardly over and beyond the rim 14. This handle 38 has a depending skirt 40 which provides a reinforcement for the handle particularly desirable when the tool is a stamping of comparatively soft metal such as aluminum. This skirt or shroud 40 is designed to provide a clear-way 42 for the rim 14 in the region where the handle bridges the rim and bead. It also serves as a feelable drag when the skirt frictionally engages one of the nibs. A user can determine by feel when the tool is positioned relative to a cutting line.

The tool when set into the pan is firmly gripped between the pan side and its coaxial abutment and this hold may be increased by the use of the rivet-like abutment 26 wherein the tool apex is placed under the overhang formed by the head on the abutment.

The features of utility may readily be incorporated into glass ware 44 and the like having the axial abutment 46 cast or molded as an integral part thereof.

As herein shown, the area of the plate portion 32 is somewhat less than the area defined by radial lines from the abutment axis extending through any adjacent pair of the index indicators. This allows a region along the radial lines for cutting of the pastry without the cutting tool engaging the lifter and yet sufficient pastry portion supporting surface is provided to lift each portion from the utensil. When the pastry is ready to be served, it is cut along the lines indicated by the index system and the tool handle 38 can be grasped and laterally reciprocated so that the tool edges 34 release the pastry from the pan. The server is then readily lifted from the pan carrying a service portion and the emptied tool can then be readily replaced into the pan through the space formed by a portion removal and the operation continued until the pan is emptied.

It is also desirable to provide integral handles for the metal pans. A pair of diametrically disposed handles 48 have the termini of their arms 50 attached to the under face of the rim 14 in some suitable manner as by welds 52. These arms 50 are provided with intermediate downwardly arched extents 54 for clearing the space through which parts of the lifter may pass as it is rotated about the pan on the rim providing track. This also positions the grip portions of the handles in a desirable relation as to a loaded pan. The handles are stamped and embossed to provide comfort in handling with an attractive appearance.

The application of the invention is also adaptable to rectangular baking pans 56 and the spade portion 58 of the lifting tool is configured to handle the pastry portions cut as indicated by the indexing 20.

The tool 28 may not only be within the pan during the baking operation, but may be independently used, and it may have one side provided with a panel 60 extending from adjacent the notch 30 to the portion 36. This type of server is particularly useful in the handling of soft or crumb pastries. As an independently operating tool, this latter type can also be used for cutting and serving cakes and the like pastries which have previously been removed from their baking utensils.

By this invention, even the first cuts of the most delicate pastries can be easily removed from their baking pans without crumbling or subjecting them to other types of breakage common in the baking art.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed and desired to secure by United States Letters Patent:

In combination, a circular pie pan having a bottom, an axial boss rising from said bottom, a side wall upwardly and outwardly extending from the bottom, said side wall terminating in an outwardly extending peripherally circular flange, said flange being provided with a series of regularly spaced protuberances outwardly projecting therefrom to form an index to guide the cutting of a pie within the pan; a pie cut remover normally nested in said pan including a base of sector form transversely arched with its bounding edges resting on the pan bottom and having its vertex engaging said boss, a side wall having substantially the height and inclination of the pan side wall and disposed in overall abutting relationship therewith, said remover side wall having a horizontal flange engaging the peripheral flange and extending thereover and beyond said protuberances, a handle integral with said latter flange and outwardly extending therefrom, and a skirt depending from said latter flange extending thereacross and about said handle, said skirt adapted to frictionally engage said protuberances as said remover is swung about said boss by the handle.

CLARA E. McNUTT.

References Cited in the file of this patent
UNITED STATES PATENTS

| Number | Name | Date |
|---|---|---|
| 1,133,168 | Mitchell-Colson | Mar. 23, 1915 |
| 1,746,614 | Sibbald | Feb. 11, 1930 |
| 2,026,829 | Ellinger | Jan. 7, 1936 |
| 2,093,307 | Cline | Sept. 14, 1937 |
| 2,196,574 | Wyman | Apr. 9, 1940 |
| 2,203,091 | Hutchinson | June 4, 1940 |
| 2,304,966 | Thrower | Dec. 15, 1942 |
| 2,327,988 | Bassett | Aug. 31, 1943 |
| 2,354,822 | Meyran | Aug. 1, 1944 |